(12) United States Patent
Strand et al.

(10) Patent No.: US 11,474,269 B2
(45) Date of Patent: Oct. 18, 2022

(54) MARINE GEOPHYSICAL SURVEYING USING A SINGLE STREAMER LAYOUT TO REPLICATE MULTIPLE BASELINE SURVEYS

(71) Applicant: PGS GEOPHYSICAL AS, Oslo (NO)

(72) Inventors: Christian Strand, London (GB); Rick Irving, Perth (AU); Magnus Wangensteen, Levanger (NO); Dan Allison, Liphook (GB)

(73) Assignee: PGS GEOPHYSICAL AS, Oiso (NO)

( * ) Notice: Subject to any disclaimer, the term of this patent is extended or adjusted under 35 U.S.C. 154(b) by 302 days.

(21) Appl. No.: 16/905,544

(22) Filed: Jun. 18, 2020

(65) Prior Publication Data

US 2020/0408946 A1 Dec. 31, 2020

Related U.S. Application Data

(60) Provisional application No. 62/867,769, filed on Jun. 27, 2019.

(51) Int. Cl.
*G01V 1/38* (2006.01)
*G01V 1/30* (2006.01)

(52) U.S. Cl.
CPC ............ *G01V 1/3808* (2013.01); *G01V 1/308* (2013.01); *G01V 1/3817* (2013.01)

(58) Field of Classification Search
CPC ...... G01V 1/38; G01V 1/3808; G01V 1/3817; G01V 1/20; G01V 1/30; G01V 1/308
USPC .............................................. 367/16, 19, 20
See application file for complete search history.

(56) References Cited

U.S. PATENT DOCUMENTS

| 8,520,468 B2 * | 8/2013 | Seale ................... G01V 1/3826 367/19 |
| 9,703,809 B2 * | 7/2017 | Gregor ..................... G01V 1/30 |
| 10,156,652 B2 * | 12/2018 | Bowman ............. G01V 1/3808 |
| 2009/0147620 A1 | 6/2009 | Pan et al. |

FOREIGN PATENT DOCUMENTS

GB 2364388 A 1/2002

OTHER PUBLICATIONS

UK Intellectual Property Office, Search Report for Application No. GB2009747.3, dated Dec. 21, 2020; 3 pages.

* cited by examiner

*Primary Examiner* — Lars A Olson

(57) ABSTRACT

Numerous techniques and apparatus are disclosed relating to the performance of 4D marine geophysical surveys over at least first and second areas covered, respectively, by first and second preexisting baseline surveys. Performing the monitor surveys may include deploying a monitor survey streamer layout that can be used to repeat streamer positions of both the first and the second preexisting baseline surveys, and using the monitor survey streamer layout to perform the monitor survey over the first and second areas in a manner that repeats all streamer positions of the first preexisting baseline survey when over the first area, and that repeats all streamer positions of the second preexisting baseline survey when over the second area. Streamer layouts corresponding to the first and second preexisting baseline surveys may differ in at least one of the following characteristics: streamer separation or total number of streamers.

20 Claims, 9 Drawing Sheets

$N_A = 6$ (EVEN)
$N_B = 6$ (EVEN)

| k | $N_{AB}$ | NUMBER OF STREAMERS ADDED TO LAYOUT B | VESSEL OFFSET REQUIRED WHEN COVERING BASE SURVEY A |
|---|---|---|---|
| 1 | 6 | 0 | 0 |
| 2 | 3 | 3 | $\frac{1}{2} S_A$ |
| 3 | 2 | 4 | 0 |
| 4 | 2 | 4 | $\frac{1}{2} S_A$ |
| 5 | 2 | 4 | 0 |

FIG. 7A $N_A = 5$ (ODD)
$N_B = 5$ (ODD)

| k | $N_{AB}$ | NUMBER OF STREAMERS ADDED TO LAYOUT B | VESSEL OFFSET REQUIRED WHEN COVERING BASE SURVEY A |
|---|---|---|---|
| 1 | 5 | 0 | 0 |
| 2 | 3 | 2 | 0 |
| 3 | 2 | 3 | $S_A$ |
|   | 1 | 4 | 0 |
| 4 | 2 | 3 | $2 S_A$ |
|   | 1 | 4 | 0 |
| 5 | 1 | 4 | 0 |

FIG. 7B $N_A = 5$ (ODD)
$N_B = 6$ (EVEN)

| k | $N_{AB}$ | NUMBER OF STREAMERS ADDED TO LAYOUT B | VESSEL OFFSET REQUIRED WHEN COVERING BASE SURVEY A |
|---|---|---|---|
| 1 | 5 | 0 | $\frac{1}{2}S_A$ |
| 2 | 3 | 2 | $S_A$ |
| 2 | 2 | 3 | 0 |
| 3 | 2 | 3 | $\frac{1}{2}S_A$ |
| 4 | 2 | 3 | 0 |
| 5 | 1 | 4 | $\frac{1}{2}S_A$ |

FIG. 7C $N_A = 6$ (EVEN)
$N_B = 7$ (ODD)

| k | $N_{AB}$ | NUMBER OF STREAMERS ADDED TO LAYOUT B | VESSEL OFFSET REQUIRED WHEN COVERING BASE SURVEY A |
|---|---|---|---|
| 1 | 6 | 0 | $\frac{1}{2}S_A$ |
| 2 | 3 | 3 | $\frac{1}{2}S_A$ |
| 3 | 2 | 4 | $\frac{1}{2}S_A$ |
| 4 | 2 | 4 | $\frac{3}{2}S_A$ |
| 4 | 1 | 5 | $\frac{1}{2}S_A$ |
| 5 | 2 | 4 | $2\frac{1}{2}S_A$ |
| 5 | 1 | 5 | $\frac{1}{2}S_A$ |

FIG. 7D

MARINE GEOPHYSICAL SURVEYING USING A SINGLE STREAMER LAYOUT TO REPLICATE MULTIPLE BASELINE SURVEYS

CROSS-REFERENCE TO RELATED APPLICATIONS

This application claims the benefit of U.S. Provisional Application Ser. No. 62/867,769, filed Jun. 27, 2019, titled "Repeating Baseline Surveys of Variable Streamer Separations with One Streamer Layout Using Skew and Source Steering," which provisional application is hereby incorporated by reference as if fully set forth herein.

BACKGROUND

Geophysical surveying is a technique where three-dimensional "pictures" of the state of an underground formation are taken. Geophysical surveying takes place not only on land, but also in marine environments such as oceans and large lakes. Marine geophysical surveying systems typically use a plurality of streamers which contain seismic sensors for detecting seismic signals reflected from the underground formation below the water bottom.

Four-dimensional ("4D") geophysical surveying involves taking multiple three-dimensional surveys over the same area at different times. Four-dimensional geophysical surveying may be used, for example, when monitoring hydrocarbon extraction from an underground formation. Four-dimensional geophysical surveying may also be used to modify secondary recovery techniques (e.g., rate of injection into injection wells) and to plan future drilling.

BRIEF DESCRIPTION OF THE DRAWINGS

For a detailed description of example embodiments, reference will now be made to the accompanying drawings in which:

FIGS. 7A-7D are tables illustrating various streamer layouts and vessel offsets in accordance with at least some embodiments.

DEFINITIONS

Figure 1:
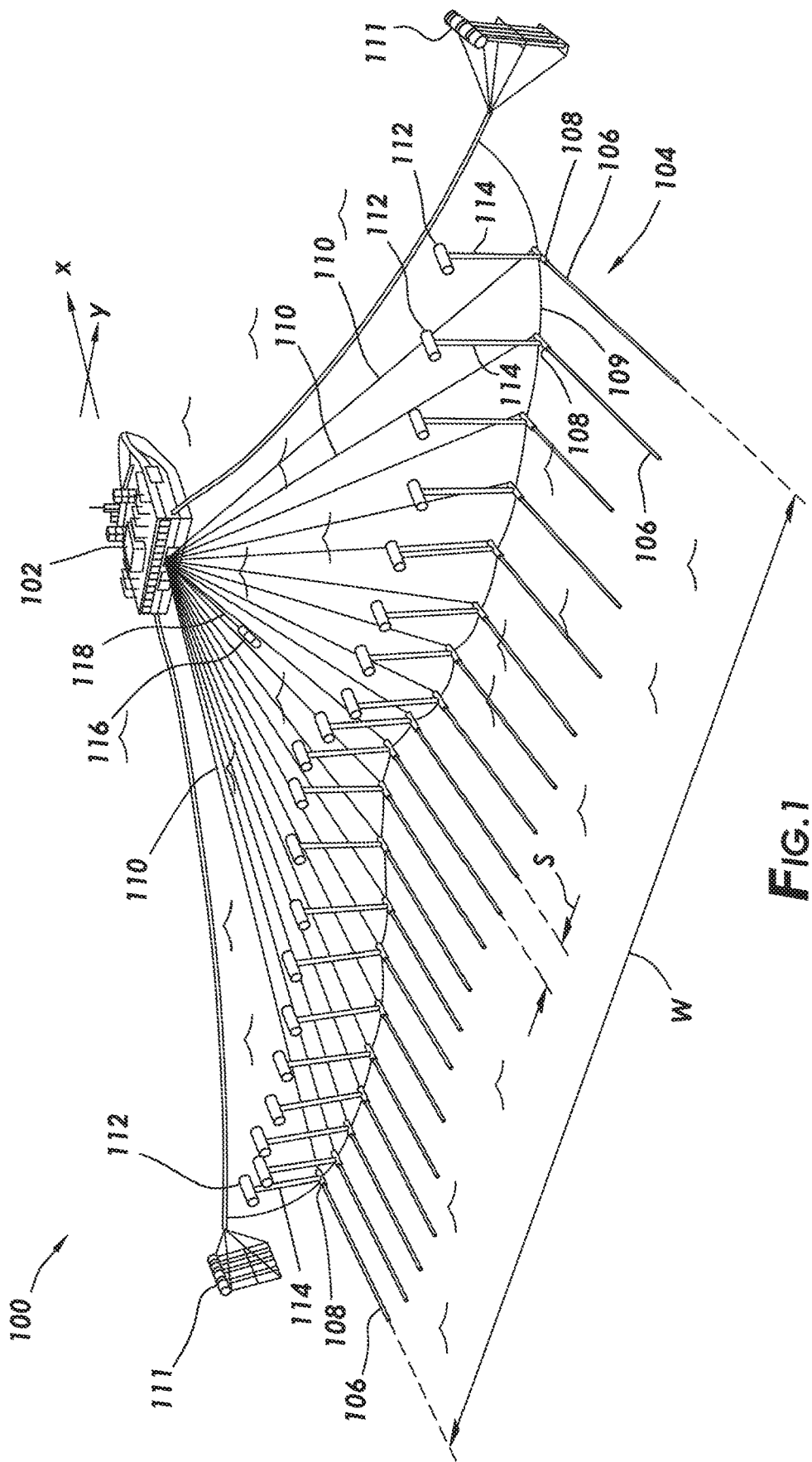
FIG. 1 shows a perspective view of an example geophysical survey system.

Various terms are used to refer to particular system components; different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Reference to a "baseline survey" with respect to a specific area shall mean a prior geophysical survey over the specific area, which could be the very first survey or any follow-on surveys over that area. Terms such as "replicate," "repeat" or "duplicate" as used herein with reference to a position shall mean, with respect to a streamer or a streamer layout, that the front or proximal end of a streamer or streamers in a survey will occupy substantially the same positions as did the front or proximal end of a streamer or streamers during a prior survey, and shall mean, with respect to a source, that the source in a survey will occupy substantially the same position or will follow substantially the same path as did a source during a prior survey. "Streamer separation" shall mean the cross-line distance between the front or proximal ends of streamers in a streamer layout. Terms such as "first" and "second" are used herein for purposes of identification and do not imply a temporal order.

DETAILED DESCRIPTION

The following discussion is directed to various embodiments. Although one or more of these embodiments may be preferred, the embodiments disclosed should not be interpreted, or otherwise used, as limiting the scope of the disclosure, including the claims. In addition, one skilled in the art will understand that the following description has broad application, that the discussion of particular embodiments is meant only to be illustrative of those and other embodiments, and is not intended to mean that the scope of the disclosure, including the claims, is limited to those embodiments.

Various example embodiments are directed to 4D marine geophysical surveying using a streamer layout that can replicate streamer layouts from multiple baseline surveys. More particularly, various embodiments are directed to performing a monitor survey over a first area with a streamer layout, and continuing the monitor survey over a second area with the same streamer layout, where a streamer layout for the baseline survey over the first area was different than a streamer layout for the baseline survey over the second area. More particularly still, example embodiments are directed to designing and using a single streamer layout for a monitor survey over multiple areas, while replicating streamer locations from the prior baseline surveys, where the baseline surveys employed different streamer cross-line spacing and/or different numbers of streamers.

FIG. 1 shows a perspective view of an example geophysical survey system 100. The geophysical survey system of FIG. 1 has a tow vessel 102 towing a streamer spread 104. The example streamer spread 104 comprises a plurality of sensor streamers 106, where each sensor streamer has a plurality of receivers or sensors (not specifically shown) spaced along the sensor streamers. The sensor streamers 106 are each coupled, at the ends nearest the tow vessel 102, to respective lead-in cable terminations 108. The lead-in cable terminations 108 are coupled to or are associated with spreader lines 109 so as to control the lateral positions of the proximal (front) ends of sensor streamers 106 with respect to each other via lateral spreading forces provided by paravanes 111. Towing force for the sensor streamers 106, as well as communication pathways between the components in the recording system on the tow vessel and the sensors, is provided by way of lead-in cables 110. In the example system, each sensor streamer also has an associated lead buoy 112 coupled to the proximal end of the respective sensor streamer by way of lines 114. The lead buoys 112 not only mark the proximal end of the sensor streamers, but in some cases also provide depth control for the proximal ends of the sensor streamers 106.

The streamer spread 104 may include many sensor streamers 106. In the example system shown, the streamer spread 104 includes 20 sensor streamers 106 and related lead-in cables 110 and lead buoys 112. In FIG. 1, an X-Y coordinate axis is shown. The X-direction is parallel to or coaxial with a sail line of the tow vessel, the Y-direction is perpendicular to the X-direction, and the X-Y plane is parallel to the surface of the water. The Y-direction is sometimes referred to as the cross-line direction, as it crosses the sail line. The cross-line offset or spacing S between adjacent sensor streamers 106 may vary, but is typically between 25 and 200 meters, and more commonly between 50 and 150 meters. Greater cross-line spacing may be used for deeper target reservoirs, whereas smaller cross-line spacing may be used for shallower target reservoirs.

The example system of FIG. 1 also comprises a seismic source 116. The seismic source 116 is towed by a dedicated tow cable 118 coupled between the seismic source 116 and the tow vessel 102. The tow cable 118 that pulls the seismic source 116 may include an umbilical with tubing to provide compressed air to the seismic source (e.g., air at 2000 pounds per square inch gauge) in addition to electrical power and communication pathways. The tow cable 118 for the seismic source 116 is sometimes referred to as a "gun umbilical cable." While FIG. 1 shows the seismic source 116 as a single entity, in many cases the seismic source 116 is made of two or more separately towed source arrays, each comprising plural source sub-elements such as individual air guns. Each source array may have its own tow cable coupled to the tow vessel or to another part of the towing harnesses located behind the vessel, and each source array may have steering capability to move the source array in the cross-line and/or the depth directions. The separation between the source arrays may vary, but is typically on the order of about 50 meters.

Figure 2:
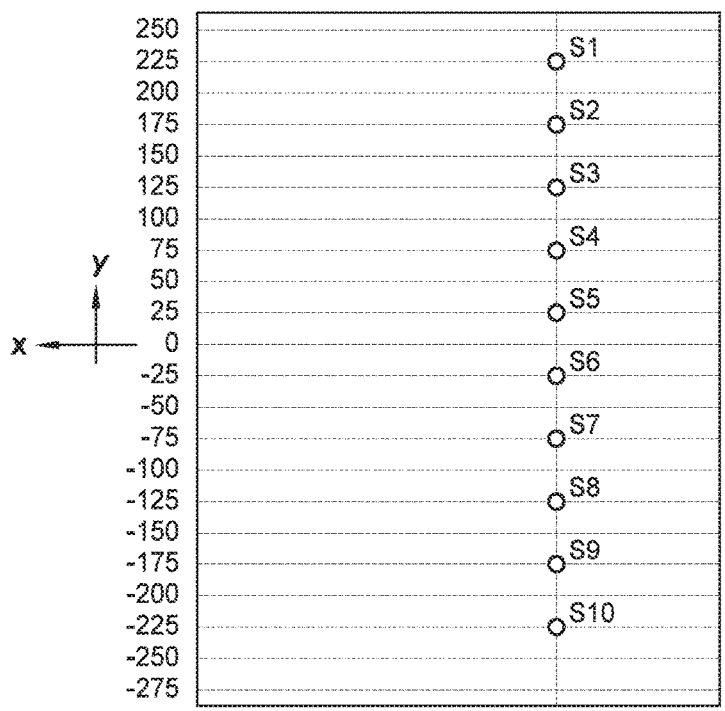
FIG. 2 shows a graphical depiction of a streamer layout of sensor streamers within a streamer spread.

FIG. 2 shows a graphical depiction of a streamer layout within a streamer spread. In general, a "streamer layout" shall mean an arrangement of a number of sensor streamers with cross-line separations between the sensor streamers. In some cases, sensor streamers are towed such that the streamers have cross-line separations that are uniform along the length of the sensor streamers (e.g., the sensor streamers are towed parallel to each other as in FIG. 1), but "streamer layout" also contemplates situations in which the cross-line separations vary as a function of distance along the streamers (e.g., a "fan tow" arrangement). Conceptually, FIG. 2 is an overhead view, and the dots represent locations of the proximal ends of the sensor streamers within the streamer spread—for example, the locations where the lead-in cable terminations 108 couple to the front or proximal ends of the sensor streamers. FIG. 2 also shows the X-Y coordinate axis where again the X-direction is parallel to or coaxial with the sail line of the tow vessel, and the Y-direction is the cross-line direction. The column of numbers on the left side of the figure represents crossline distance from the tow vessel centerline, with the tow vessel considered to be at the zero location. The dots show the locations of an example set of ten sensor streamers, labeled S1-S10, each at a different location in the Y-direction relative to the tow vessel centerline. In the example streamer layout of FIG. 2, there are ten streamers, S1-S10, with cross-line separation between the sensor streamers of 50 meters. As the example illustrates, using ten sensor streamers with a 50 meter cross-line separation between each streamer results in a total cross-line width W of 450 meters for the streamer spread. In general, if the number of streamers in a streamer spread is N, and each is separated from the adjacent streamers by a cross-line separation S, then the total cross-line width of the streamer spread is given by W=S(N−1).

Figure 3:
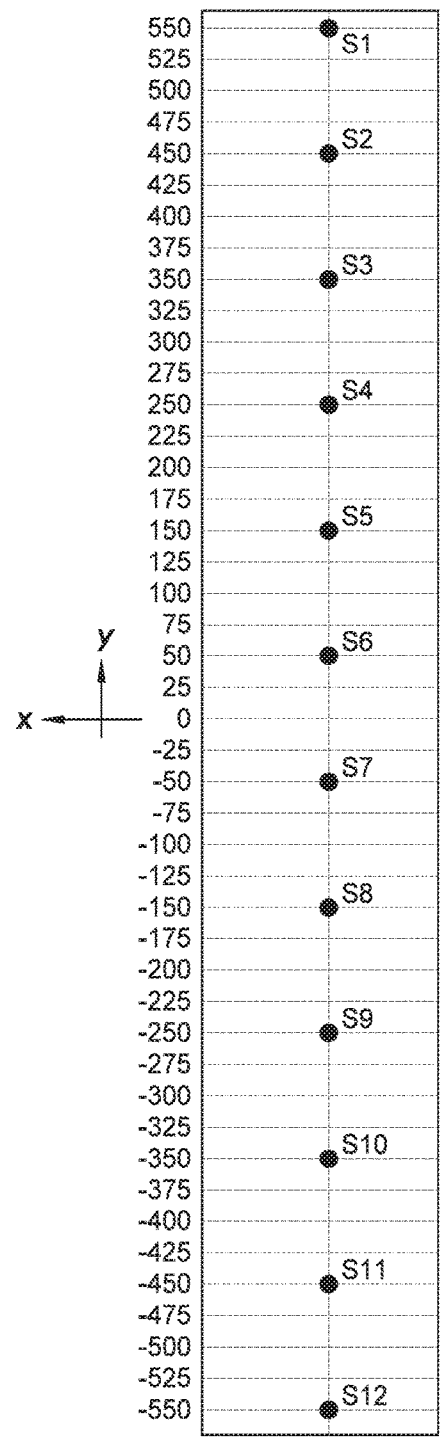
FIG. 3 shows a graphical depiction of a streamer layout within a different streamer spread.

FIG. 3 shows a graphical depiction of a different streamer layout within a streamer spread. In particular, FIG. 3 shows the X-Y coordinate axis where again the X-direction is parallel to or coaxial with the sail line of the tow vessel, and the Y-direction is the cross-line direction. As before, the column of numbers on the left side of the figure represents distance in the Y-direction from the tow vessel centerline with the tow vessel considered to be at the zero location. The dots show the locations of an example set of twelve sensor streamers, labeled S1-S12, each streamer at the indicated cross-line locations relative to the zero position. As before, FIG. 3 can conceptually be considered to be an overhead view, and the dots represent location of the proximal ends of the sensor streamers within the streamer spread. In the example streamer layout of FIG. 3, there are twelve sensor streamers, S1-S12, with cross-line separation between the sensor streamers of 100 meters. The example twelve sensor streamers with 100 meter cross-line separation results in a total cross-line width W of 1100 meters for the streamer spread, as W=100*(12−1)=1100.

When performing a four-dimensional seismic survey over a particular area, it is desirable for a monitor survey over the area to replicate the streamer positions and source activation locations that were used in a baseline survey previously performed over the same area. Thus, it is desirable to perform the follow-on or monitor survey by placing the sensor streamers for the monitor survey in the same or close to the same positions that the sensor streamers occupied in the baseline survey. Similarly, it is desirable during the follow-on or monitor survey to activate the seismic sources in the same or close to the same locations where the seismic sources in the baseline survey were activated. Moreover, it is sometimes the case that monitor surveys must be performed over adjacent or nearby areas, where the streamer layouts used in the baseline surveys over those areas differed in one or more aspects. For example, a first number of streamers with a first cross-line streamer separation may have been used during a baseline survey over a first area, and a second number of streamers with a second cross-line streamer separation may have been used during a baseline survey over the second area. Conventional practice for monitor surveys over such areas has been to cover the first area using a first monitor survey streamer layout, to reconfigure the monitor survey streamer layout between the first and second areas, and then to cover the second area using a second monitor survey streamer layout different than the first.

For purposes of explanation, assume that the streamer layout of FIG. 2 was the streamer layout used for a baseline survey over a first hydrocarbon formation, or corresponding to a first area over the sea bottom. Further assume that the streamer layout of FIG. 3 was the streamer layout used for a baseline survey over a second hydrocarbon formation, or corresponding to a second area over the sea bottom, the second area different than the first area. Comparing the layouts shown in FIGS. 2 and 3 reveals that none of the streamers in the layout of FIG. 2 shares a cross-line offset, relative to the vessel centerline, with any of the streamers in the layout of FIG. 3. Under conventional practice, then, the monitor survey tow vessel would sail to the first survey area and would deploy a streamer spread having a layout as shown in FIG. 2. Depending on the number of streamers to be deployed and environmental factors (e.g., high winds, high seas, ocean currents), deploying the streamer layout may take seven days or more. The tow vessel may then perform a monitor survey over the first area with the streamer layout as depicted in FIG. 2. Before being able to perform a monitor survey over the second area associated with the streamer layout as depicted in FIG. 3, the streamer spread conventionally would be re-configured to duplicate the streamer layout of the baseline survey previously performed over the second area. Depending on the number of streamers to be added or removed, the amount of change of cross-line separation, and environmental factors, reconfiguring the streamer layout may take seven or more additional days. Each day of reconfiguration adds cost to the monitor survey and increases safety risks to the vessel, to the towed equipment, and to the crew.

It is an objective of the embodiments disclosed herein to enable the use of a single streamer layout during a monitor survey to replicate different streamer layouts from multiple baseline surveys, thereby saving the time and costs associated with reconfiguring the streamer spread during the monitor survey, and also avoiding the safety risks inherent in that activity.

In one embodiment, a tow vessel for a monitor survey over the two baseline areas might be configured to tow a single spread of 22 streamers simultaneously, with the cross-line offsets of the streamers chosen to result in the direct superposition of the layouts of FIGS. 2 and 3. Such an arrangement would enable a single monitor survey to cover both baseline surveys without reconfiguring the streamer spread during the monitor survey, thus achieving the aforementioned objectives. In practice, however, such an arrangement may result in a number of problems. First, conventional towing vessels may not be equipped to carry enough sensor streamers to deploy the requisite number of streamers simultaneously. Second, several of the streamers in the composite layout would have to be towed at a cross-line separation of only 25 meters one from the other, which can potentially lead to downtime related to streamer tangling and to equipment damage. Third, even if the requisite number of streamers could be provided and the requisite cross-line separations maintained, conventional towing vessels may not have sufficient power to tow such a large streamer spread. Fourth, even if the requisite power were available, towing such a large streamer spread would require a significant amount of fuel due to the drag caused by the number of streamers in the spread.

Some or all of these issues may be addressed beneficially by further embodiments to be described below. In these further embodiments: (1) none of the monitor survey streamers need be towed at cross-line separations smaller than either of the two baseline surveys; and (2) the total number of streamers used in the monitor survey may be less than or equal to the sum of the streamers used in the two baseline surveys.

Figure 4:
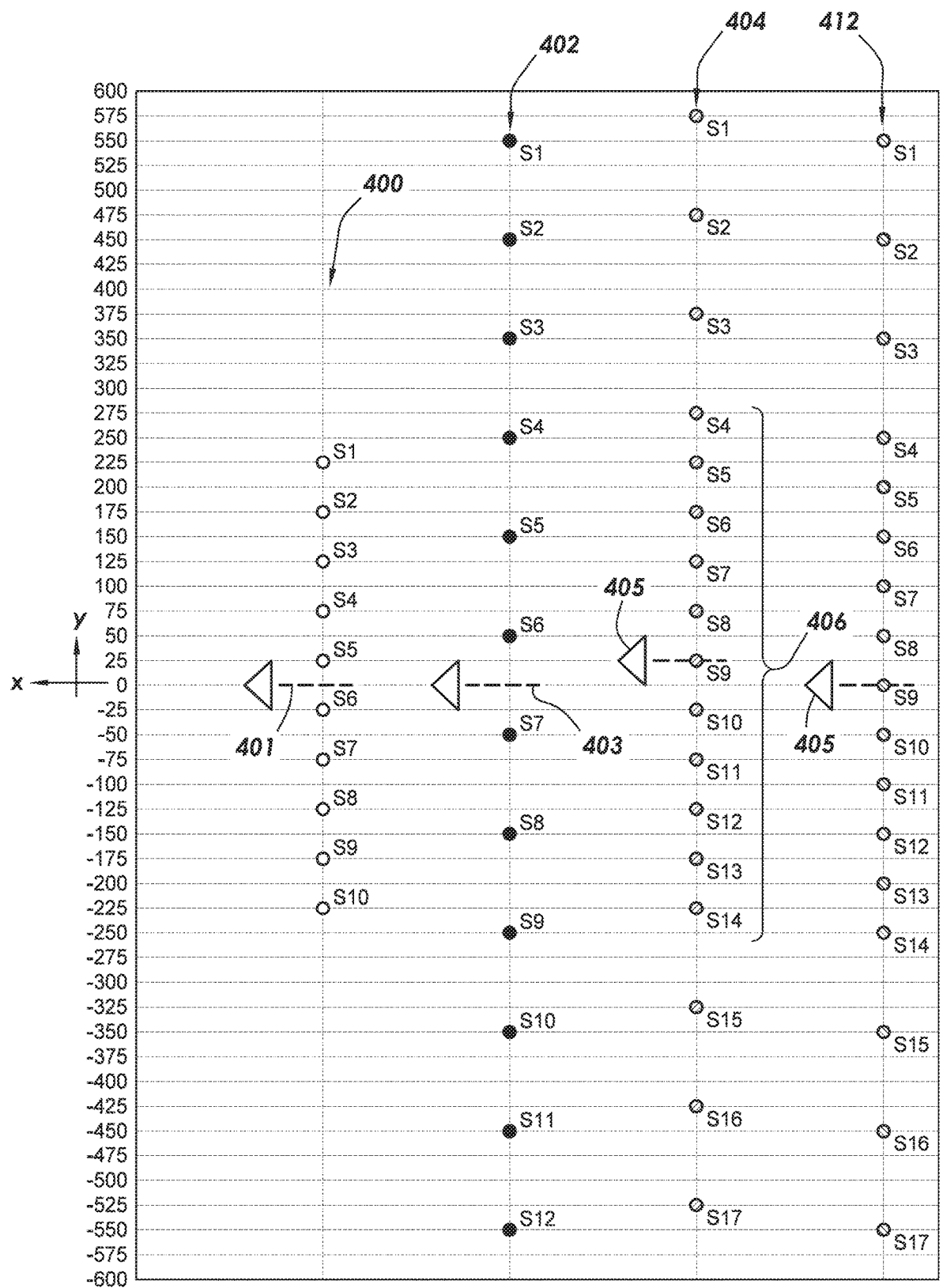
FIG. 4 shows a graphical depiction of streamer layouts within streamer spreads in accordance with at least some embodiments.

By way of example, FIG. 4 shows a graphical depiction of streamer layouts within streamer spreads in accordance with at least some embodiments. In particular, FIG. 4 shows the X-Y coordinate axis as in the previous figures. The column of numbers on the left side of the figure represents distance in the Y-direction (the cross-line direction) from an arbitrarily chosen zero location. Column 400 represents the locations of the set of ten sensor streamers S1-S10 from FIG. 2, and thus the streamer layout of an example baseline survey over a first area. Column 402 represents the locations of the set of twelve sensor streamers S1-S12 from FIG. 3, and thus the streamer layout of an example baseline survey over a second area. As was previously noted, the baseline survey over the second area, which used streamer layout 402, employed a different number of streamers and different cross-line streamer separations than were employed in the baseline survey over the first area, which used streamer layout 400. Columns 404 and 412 both illustrate a single layout of sensor streamers S1-S17 according to an example embodiment that may be used to perform a monitor survey over both of the first and second areas without reconfiguring the streamer layout during the monitor survey. Note that the streamer layout of columns 404 and 412 comprises only seventeen streamers (not twenty-two). And yet, when the streamer layout is towed at different crossline offsets relative to the sail lines of the baseline surveys as will be described below, streamers within the single layout can be made to correspond exactly to the streamer positions of either the first or the second baseline surveys. Note also that none of the streamers in the layout of FIGS. 404 and 412 is towed at a cross-line separation that is narrower than either of the two baseline surveys.

Assume, for example, that the "0" offset position shown in the figure corresponds to the vessel centerlines—and thus to the sail lines—used during each of the first and second baseline surveys. Assume further that the streamer layout shown in columns 404 and 412 is configured to be towed behind a monitor survey vessel 405 such that the centerline of the monitor survey vessel corresponds to the cross-line position of streamer S9 in the monitor survey streamer spread, as shown. Using such an arrangement, and referring to column 412, placing the centerline of monitor survey vessel 405 directly over sail line 403 (which corresponds to the second baseline survey depicted at 402) causes twelve of the streamers in the monitor survey layout to occupy the same cross-line positions relative to sail line 403 as do the twelve streamers depicted in column 402. A comparison of column 412 with column 402 demonstrates this. Specifically, streamers S1, S2, S3 and S4 of column 412 have the same cross-line offsets relative to sail line 403 as do streamers S1, S2, S3 and S4 of column 402. Streamers S6, S8, S10, S12 and S14 of column 412 have the same cross-line offsets relative to sail line 403 as do streamers S5, S6, S7, S8 and S9 of column 402. And streamers S15, S16 and S17 have the same cross-line offsets relative to sail line 403 as do streamers S10, S11 and S12 of column 402.

Assume now, as shown at 404, that the centerline of monitor survey vessel 405 is placed at a +25 meter offset relative to sail line 401 (which corresponds to the first baseline survey depicted at 400). Such a placement causes ten of the streamers in the monitor survey layout to occupy the same cross-line positions relative to sail line 401 as do the ten streamers depicted in column 400. Comparing column 404 with column 400 demonstrates this. Specifically, streamer S5 of column 404 has the same cross-line position relative to sail line 401 as does streamer S1 of column 400. Similarly, streamers S6-S14 in column 404 respectively correspond to the cross-line positions of streamers S2-S10 in column 400. Thus a single monitor survey streamer layout comprising fewer streamers than the sum of the streamers used in the two baseline layouts can be used to replicate, more efficiently, the streamer positions of both baseline layouts. In general, a first subset of streamers in the monitor survey streamer layout may correspond to the streamer layout of one of the baseline surveys, and a second subset of streamers in the monitor survey streamer layout may correspond to the streamer layout of another baseline survey. In embodiments where the total number of streamers in the monitor survey streamer layout is less than the sum of the streamers used in the baseline survey layouts, at least one of the streamers in the monitor survey layout will be in both of the subsets.

As was previously stated, while it is generally considered desirable in 4D surveying to replicate, during a monitor survey, the streamer positions used during the baseline surveys, it is also considered desirable to replicate the source activation positions used during the baseline surveys. Methods for doing so in accordance with embodiments will now be discussed with reference to FIG. 5.

Figure 5:
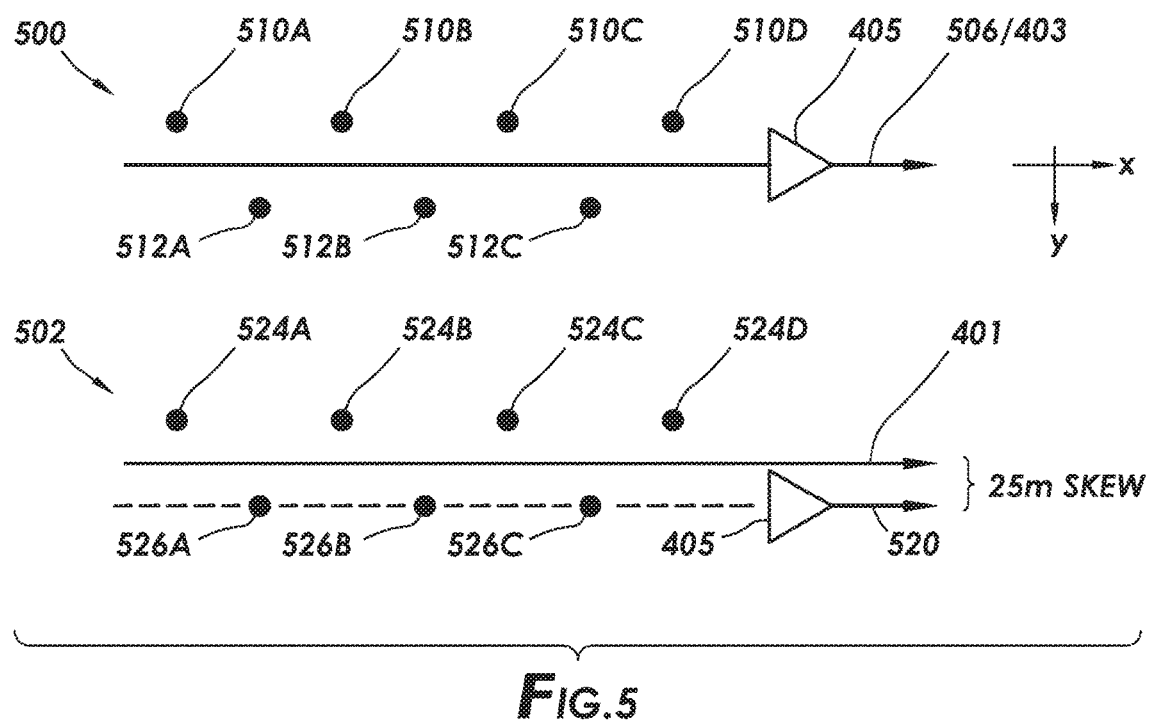
FIG. 5 shows an overhead view of source spacing and activation positions in accordance with at least some embodiments.

FIG. 5 shows an overhead view of source spacing and activation positions in accordance with at least some embodiments. In particular, the upper portion 500 of FIG. 5 shows an example portion of a monitor survey in which the sail line of tow vessel 405 is substantially coaxial with a sail line from a baseline survey, and the lower portion 502 of FIG. 5 shows an example portion of the monitor survey in which the sail line of tow vessel 405 has a cross-line offset relative to the sail line from a baseline survey. In both of the example portions 500 and 502, vessel 405 tows port and starboard source arrays at a cross-line source array separation of approximately 50 meters.

Referring to the upper portion 500, monitor survey vessel 405 is shown sailing along a sail line 506. Sail line 506 is shown to be substantially coaxial with sail line 403 from the baseline survey of the second area discussed above. The upper portion 500 thus corresponds to a sail line taken by vessel 405 when towing the streamer layout of column 404/412 of FIG. 4 over the area whose baseline survey was taken with the streamer layout shown in column 402. The upper portion 500 also shows a plurality of source firing or source activation positions for both the baseline survey 402 and the monitor survey. Locations 510A-510D show activation positions of a port geophysical source array. The port geophysical source array travels along a path that is offset to the port side of sail line 506/403, and the port geophysical source array fires, or activates, at each of the locations 510A-510D during baseline survey 402 and during the monitor survey. Locations 512A-512C show activation positions of a starboard geophysical source array. The starboard geophysical source array travels along a path that is offset to the starboard side of sail line 506/403, and the starboard geophysical source array fires, or activates, at each of the locations 512A-512C during baseline survey 402 and during the monitor survey. The upper portion 500 thus illustrates the relationship of the tow vessel 405, and the positions of the source activations, for a portion of a monitor survey where no cross-line offset is used for the tow vessel 405 relative to the sail line of a base survey—such as would be the case when performing a monitor survey over the area whose baseline survey used the streamer layout shown in column 402 of FIG. 4.

Referring now to the lower portion 502, monitor survey vessel 405 is shown sailing along a sail line 520. Sail line 520 has a cross-line offset from sail line 401, which corresponds to the baseline survey over the first area discussed above. The lower portion 502 thus illustrates a sail line taken by vessel 405 when towing the streamer layout of columns 404/412 of FIG. 4 over the area whose baseline survey was taken using the streamer layout in column 400. The lower portion 502 also shows a plurality of source firing positions for both the baseline survey 400 and the monitor survey. Locations 524A-524D show activation positions of the port geophysical source array. The port geophysical source array travels along a path that is offset to the port side of sail line 401 of the base survey, and is offset even further to the port side of sail line 520 of the monitor survey. The port geophysical source array fires or activates at each of the locations 524A-524D. Locations 526A-526C show activation positions of the starboard geophysical source array. In this example, the starboard geophysical source array travels along a path that is offset to the starboard side base survey sail line 401, but is substantially in-line with sail line 520 due to the 25 meter offset between sail lines 401 and 520. The lower portion 502 thus illustrates the relationship of vessel 405, and positions of the source activations, for a portion of the monitor survey where tow vessel 405 sails at a cross-line offset relative to the sail line of a base survey—such as would be the case when performing the monitor survey over the area whose baseline survey was taken with the streamer layout shown in column 400 of FIG. 4.

In order to achieve the activations at locations 510A-510D and 512A-512C, the port and starboard geophysical source arrays are steered to the port and starboard sides, respectively, of sail line 506/403 during performance of the monitor survey. This can be done using known techniques, such as by towing each of the port and starboard source arrays with separate cables and by issuing control commands from vessel 405 to lateral steering devices located on or near the source arrays. Similarly, in order to achieve the activations at the locations 524A-524D and 526A-526C, the starboard source array is steered during the monitor survey so that it remains substantially in-line with sail line 520, while the port source array is steered to the port side of sail line 401, as shown. Persons having skill in the art will appreciate that the source array separations shown in these embodiments are for illustration only. In other embodiments, the steering of the source arrays may be adjusted to accommodate different baseline survey source separations and different sail line offsets.

Figure 6A:
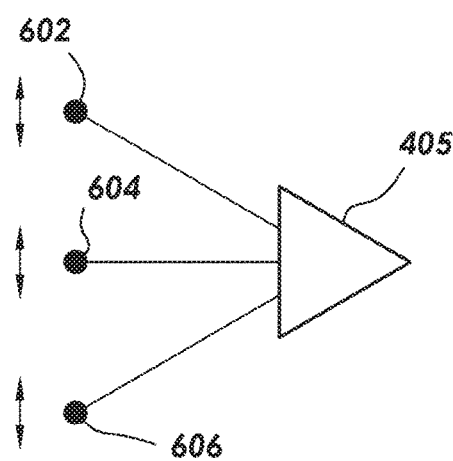
FIGS. 6A-6B show an overhead view of example source towing configurations in accordance with at least some embodiments.
Figure 6B:
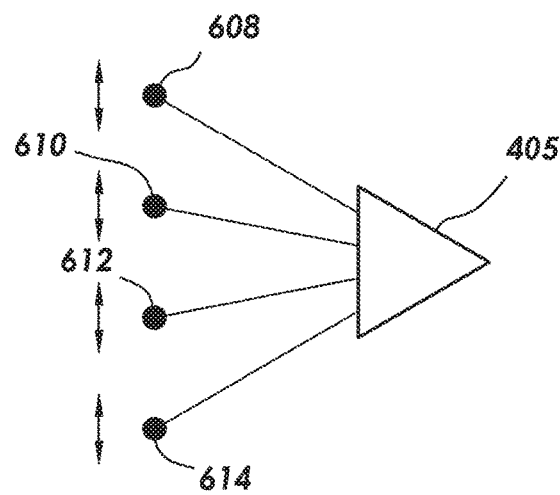

In some embodiments, greater cross-line offsets may be required between the monitor survey and base survey sail lines than those just illustrated. Depending on the distances involved, this could potentially cause difficulty in repeating the base survey shot positions through source steering alone. In such embodiments, additional source arrays may be towed at a variety of nominal cross-line offsets from vessel 405, as shown in FIGS. 6A-6B. For example, three source arrays (FIG. 6A), four sources arrays (FIG. 6B), or more, may be towed with appropriate cross-line separations between them, such as 50 meters. Using such arrangements, when the sail line of vessel 405 is at a large starboard offset relative to a base survey sail line, the port-most source arrays (e.g. 602/604 or 608/610) may be used to repeat the base survey shot positions so that the amount or source steering required will be reduced. Similarly, when the sail line of vessel 405 is at a large port offset relative to a base survey sail line, the starboard-most source arrays (e.g. 604/606 or 612/614) may be used to repeat the base survey shot positions. The center-most source arrays (e.g. 602/604, 604/606, or 610/612) may be used when vessel 405 is sailing on top of the base survey sail lines.

Embodiments are not limited to the specific streamer layouts illustrated in the just-described examples. Moreover, some embodiments do not require that the monitor survey must sail at a cross-line offset from the sail lines of one of the baseline surveys.

Let $S_A$ be the cross-line streamer separation for baseline survey A, let $N_A$ be the number of streamers used in survey A, and let $W_A$ be the total width of the streamer spread of survey A. Similarly, let $S_B$ be the cross-line streamer separation for baseline survey B, let $N_B$ be the number of streamers used in survey B, and let $W_B$ be the total width of the streamer spread of survey B. Finally, let $N_M$ be the total number of streamers required for a monitor survey streamer layout to cover both of baseline surveys A and B without reconfiguring the streamer spread. In general, the above-described techniques may be used to design a single monitor survey streamer layout such that $N_M \leq N_A + N_B$, provided (1) that $S_B$ is an integer multiple of $S_A$, and (2) that $W_B \geq W_A$. The first condition will be true when $S_B = kS_A$, where k is a positive natural number (1, 2, 3, . . . ).

Specifically, whenever the above two conditions are true, it is always possible during the monitor survey to reuse streamers from the layout of survey B to cover a certain number of streamers, $N_{AB}$, from the layout of survey A as follows.

$$N_{AB} = \begin{cases} \text{ceil}\left(\frac{N_A}{k}\right), & S_B \leq W_A \\ 1, & S_B > W_A \end{cases} \quad (1)$$

where cell denotes a ceiling function, which is a function that maps a real number X to the least integer greater than or equal to X. Thus, in every such case, $$N_M = N_A + N_B - N_{AB} \leq N_A + N_B - 1, \quad (2)$$

and, when $S_B \leq W_A$, $N_M$ can be as small as $$N_M = N_A + N_B - \text{ceil}\left(\frac{N_A}{k}\right). \quad (3)$$

To design the streamer layout for the monitor survey, then, one may generally start with the layout of baseline survey B and simply add $N_A - N_{AB}$ streamers around the center of the layout such that the cross-line separation for the streamers in the center of the layout is $S_A$. See, for example, the center portion 406 in column 404 of FIG. 4. In that example, $S_B = 100$ meters and $W_A = 450$ meters, so $S_B \leq W_A$. Therefore, $N_{AB} = \text{ceil}(N_A/k) = \text{ceil}(10/2) = 5$, and $N_A - N_{AB} = 10 - 5 = 5$. So, $N_M = N_A \pm N_B - N_{AB} = 10 \pm 12 - 5 = 17$, as shown for the monitor streamer layout of columns 404 and 412. As can be appreciated from the drawings, the design of monitor layout 404/412 may be performed by starting with the layout of column 402, and by adding 5 streamers around the center of the layout such that the cross-line separation for the streamers in the center of the layout is $S_A$, or 50 meters in this case. In the example of FIG. 4, the extra streamers can be added symmetrically as shown. In other cases, one of the outermost added streamers may not have a symmetrical counterpart on the opposite side of the streamer spread. In those cases, the cross-line offset for the monitor vessel sail lines during part of the monitor survey would be in the opposite direction of the asymmetrical streamer (e.g., if the asymmetrical streamer is on the starboard side of the spread, then the vessel sail line offset while covering one of the baseline surveys would be to the port side of the base survey sail lines). If such a constraint is deemed unsatisfactory or undesirable, then in other embodiments one additional streamer may be added to the opposite side of the center portion in order to create symmetry among the closely spaced streamers at the center of the spread. When the latter solution is chosen, any requisite monitor vessel sail line offset may be performed on either side of the relevant base survey sail lines.

In all embodiments, streamers in the resulting monitor survey streamer layout can be taken as two subsets: one subset that corresponds to the streamer layout of baseline survey A, and another subset that corresponds to the streamer layout of baseline survey B—as described above, for example, in relation to FIG. 4. And, as was stated above, in embodiments in which $N_M < N_A + N_B$, at least one monitor survey streamer will be in both subsets.

A wide variety of embodiments is possible using the above-described observations and techniques. FIGS. 7A-7D further illustrate this by summarizing numerous different combinations of streamer layouts, cross-line streamer separations and monitor vessel sail line offsets. Each table assumes that the cross-line streamer separation used for a baseline survey B was an integer multiple of the cross-line streamer separation used for a baseline survey A, and assumes that $W_B \geq W_A$. The rows in each table correspond to different values of k as indicated in the left-most column. That is, each row corresponds to a scenario in which the cross-line streamer separation for baseline survey B was a certain integer multiple (the k value) of the cross-line streamer separation of baseline survey A. In each of the scenarios illustrated, a monitor survey is able to cover both of the baseline surveys using a single monitor survey streamer layout without reconfiguring the streamer layout during the monitor survey. Column $N_{AB}$ in each table indicates the number of streamers from the layout of survey B that can be used during the monitor survey to cover some of the streamer positions from the layout of survey A. The next column indicates how many additional streamers must be added to the center portion of the layout from baseline survey B in order to achieve a monitor survey layout that can cover both of the baseline surveys. The last column indicates the magnitude of the sail line offset, relative to the sail lines of baseline survey A, that must be employed by the monitor survey vessel while covering the area corresponding to survey A. In all of these examples the sail line offset, relative to the sail lines of baseline survey B, to be used during the monitor survey when covering the area corresponding to survey B, will be zero.

Note that each of these examples assumes, for the sake of simplicity, that the centerline of the survey vessel would be located at the cross-line center of the streamer spread being towed. The vessel offsets shown in the tables correspond to that assumption. Such is not a requirement, however. In other embodiments, the towing arrangement may be designed such that the towing vessel is located at a cross-line offset relative to the center of the towed streamer spread. Persons having skill in the art and having reference to this disclosure will readily appreciate that the same techniques may be applied in those embodiments, and that the same benefits may be achieved, provided corresponding adjustments are made to the sail line offsets to be used during the monitor survey.

As indicated by the text just above the tables, each of FIGS. 7A-7D further assumes that certain numbers of streamers were used in the two baseline surveys to be covered by the monitor survey. These numbers are chosen here only for simplicity of illustration. In other embodiments, different numbers of streamers may be used, and the same principles can be applied.

FIG. 7A explores cases in which the number of streamers ($N_A$, $N_B$) used in each baseline survey was even, while FIG.

7B shows cases in which $N_A$ and $N_B$ were both odd. FIG. 7C shows cases in which $N_A$ was odd and $N_B$ was even. FIG. 7D shows the opposite case, in which $N_A$ was even and $N_B$ was odd.

Rows 702 and 704 correspond to degenerate cases where the streamer layouts used for both baseline surveys A and B were identical. Rows 706 and 708, however, illustrate that principles in accordance with embodiments may be beneficially employed even where k=1, that is, where the streamer separation used for both baseline surveys was the same, but where one of $N_A$ and $N_B$ was odd and the other was even. In each of those cases, all of the streamer positions of survey layout A can be covered with streamers in survey layout B. Thus the streamer layout from survey B can be used during the monitor survey to cover the area corresponding survey A, by simply employing a monitor vessel offset of ½ $S_A$ relative to the sail lines used during baseline survey A, and by employing any of the above-described or other techniques to repeat the source firing positions corresponding to survey A. The monitor survey would employ the same streamer layout to cover the area corresponding to survey B, but without a sail line offset relative to the sail lines of survey B.

Row 710 corresponds to the situation depicted and described above in relation to FIGS. 4 and 5, where half of the streamers from survey A can be covered during the monitor survey using streamers from the layout or survey B. In the example of row 710, the monitor survey streamer layout may be designed by starting with the survey B layout and adding 3 streamers to the center portion of the survey B layout (in this case $N_A$=6, not 10 as was the case in FIG. 4), such that the streamer separations in the center portion are equal to $S_A$ and the streamer separations in the outer portions of the layout are equal to $S_B$. The resulting monitor survey layout may then be used to cover the area corresponding to survey A by employing a ½ $S_A$ monitor vessel offset relative to the sail lines of survey A. The same monitor survey layout can be used to cover the area corresponding to survey B by employing a zero offset relative to the sail lines of survey B.

Row 712 illustrates scenarios where $S_B$=2$S_A$ as in row 710, but where both $N_A$ and $N_B$ are odd. If the survey vessels for both baseline surveys and the vessel for the monitor survey are all positioned at the cross-line center of their respective towed spreads (as is assumed for all the examples in FIG. 7), then no sail line offsets are required during the monitor survey over either of the baseline survey areas. Rather, all that is required in this scenario is to add 2 streamers to the center portion of the survey B streamer layout in order to cover all of the survey A streamer positions during the monitor survey. Because $N_{AB}$=3 in this example, 3 streamer positions from survey A will be covered during the monitor survey by streamers from the survey B layout. The remaining 2 streamer positions from survey A will be covered during the monitor survey by the 2 streamers that were added to the survey B layout.

Row 714 illustrates that, when $S_B$=2$S_A$ and $N_A$ is odd but $N_B$ is even, then a full $S_A$ sail line offset will be required during the monitor survey over area A in order to minimize the number of streamers required during the monitor survey, as indicated at 716. If the $S_A$ sail line offset is deemed too high for any reason, then an additional streamer can be added to the center portion of the survey B layout, for a total of 3 added streamers instead of the minimal 2. If the latter solution is chosen, then no sail line offset would be required during the monitor survey while covering area A, as indicated at 718.

Referring now to row 720, when $S_B$=2$S_A$ and $N_A$ is even but $N_B$ is odd, only a ½$S_A$ sail line offset will be required during the monitor survey when covering the area of survey A, and yet the minimal number of monitor survey streamers may be used. (In this case, only 3 streamers need to be added to the center of the survey B layout.)

Row 722 is similar to the case illustrated by row 714. When $S_B$=3$S_A$ and both of $N_A$ and $N_B$ are odd, then a full $S_A$ sail line offset will be required during the monitor survey over area A in order to achieve the minimal number of streamers in the monitor survey layout, as indicated at 724. If such a sail line offset is deemed too high, then instead one additional streamer may be added to the center portion of layout B, and no sail line offset will be required during the monitor survey over area A, as indicated at 726. In each of the other cases where $S_B$=3$S_A$ (see rows 728, 730 and 732), the minimal number of streamers may be used in the monitor survey layout, and at most a ½$S_A$ will be required when covering area A during the monitor survey.

When $S_B$=4$S_A$ and both of $N_A$ and $N_B$ are odd (row 734), a 2$S_A$ sail line offset would be required during the monitor survey over area A if using the minimal number of streamers possible in the monitor survey layout, as indicated at 736. If a 2$S_A$ sail line offset is deemed too high, then an extra streamer may be added to the center portion of the monitor survey layout, and no sail line offset will be required while covering area A during the monitor survey, as indicated at 738. The case illustrated by row 740 is similar: If the minimal number of streamers is to be used during the monitor survey, then a 3/2$S_A$ sail line offset will be required during the monitor survey when covering area A, as indicated at 742; but if one extra streamer is added to the center portion of the monitor survey layout, then only a ½$S_A$ sail line offset will be required when covering area A, as indicated at 744. For each of the other cases where $S_B$=4$S_A$ (see rows 746 and 748) at most a ½$S_A$ sail line offset will be required when covering area A with the minimum number of streamers.

Row 750 illustrates that when $S_B$=5$S_A$ and $N_A$ is even but $N_B$ is odd, a 2½$S_A$ sail line offset would be required during the monitor survey over area A to use the minimum number of streamers (as indicated at 752), whereas only a ½$S_A$ sail line offset would be required if one extra streamer is added (as indicated at 754). In each of the other cases where $S_B$=5$S_A$ (see rows 756, 758 and 760), at most a ½$S_A$ sail line offset would be required during the monitor survey over area A to employ the minimum number of streamers during the monitor survey.

The examples of FIG. 7 illustrate that, when $S_B$=k$S_A$ for positive natural number k and when $W_B \geq W_A$, it is always possible using the techniques described herein to construct a single monitor survey streamer layout to cover both of areas A and B without reconfiguring the monitor survey streamer layout during the monitor survey, such that (1) the required sail line offsets during the monitor survey, relative to the sail lines of either of the base surveys A or B, is at most ½$S_A$; and (2) $N_m$ is at most $N_A+N_B-\text{ceil}(N_A/k)+1$. The examples of FIG. 7 further illustrate that, in some embodiments (e.g. those analogous to rows 706 and 708), the streamer separation in the monitor survey layout may be constant; but in other embodiments (e.g. those analogous to the other rows in FIG. 7 excluding rows 702 and 704), the streamer separation in the monitor survey layout may not be constant.

In most of the above-described embodiments, the monitor survey vessel will be towing more streamers over area B than were used during the baseline survey that was performed over area B. Accordingly, the survey vessel may record data collected by the additional streamers during the monitor survey over area B in some of those embodiments, or choose not to record data from the additional streamers during the monitor survey over area B. It is believed that, in most such cases, the data from the additional streamers would be recorded over area B so that they may be used, if desired, during data processing and imaging. If, on the other hand, the data are not desired at the time of data processing and imaging, then they may be disregarded at that time.

Most, if not all, monitor surveys are planned in advance by onshore personnel and programs. That is, each monitor survey and the areas over which the monitor surveys will be run are known in advance. In accordance with example embodiments, the onshore planning may involve designing the streamer layout that efficiently replicates the streamer layouts of multiple baseline surveys. Moreover, in accordance with example embodiments, the onshore planning may involve determining the sail lines for each pass of the monitor survey over each of the baseline survey areas. Where applicable, the sail lines determined may include cross-line offsets to align the monitor streamer layout with the prior streamer layouts of the baseline surveys, as illustrated above.

In accordance with example embodiments, the planning may result in a survey plan comprising two or more 4D plot plans. Each such 4D plot plan describes or encodes the streamer layout to be used during a monitor survey over designated areas, describes or encodes a plurality of sail lines over the designated areas, and describes or encodes source activation positons for one or more geophysical sources over the designated areas. Though each 4D plot plan can take any suitable form, in some cases the 4D plot plans may be electronic files that encode the data in a predetermined format, such as the United Kingdom Offshore Operators Association P1/90 format. Other encoding formats may be used. The survey plan may then be saved to computer-readable media, such as a magnetic disc, an optical CD or DVD disc, a solid-state drive, or USB "thumb" drive, and transferred to the tow vessel. In other cases, the survey plan may be electronically transmitted to a computer system onboard the tow vessel, such as a navigation and control system, and stored on a long-term storage device of the navigation and control system. The navigation and control system may take any suitable form, such as an ORCA®-brand towed streamer navigation, command, and control system available from Ion Geophysical Corporation of Houston, Tex. Once at sea and with the streamer layout deployed in a manner corresponding to the survey plan, the navigation and control system may execute the survey plan of each 4D plot plan, steering the tow vessel along the designated sail lines, and steering the geophysical sources, such that the locations of the geophysical streamers and sources match the designed streamer locations and source activation positions, respectively, of the 4D plot plans.

The various embodiments discussed to this point reference the locations of the proximal ends of the sensor streamers of each streamer layout. In some cases, each sensor streamer is towed such that the sensor streamer follows along behind the proximal end in a direction parallel to the direction of tow. In other cases, however, the proximal ends may take the designated locations, but the sensor streamers "fan" out on each side of the sail line, sometimes referred to as "fan tow." Stated otherwise, in some cases the proximal ends take the designated locations, but steering devices along the sensor streamers steer each sensor streamer to form a non-zero angle with respect to the sail line, if the baseline survey being replicated used the fan tow technique.

Figure 8:
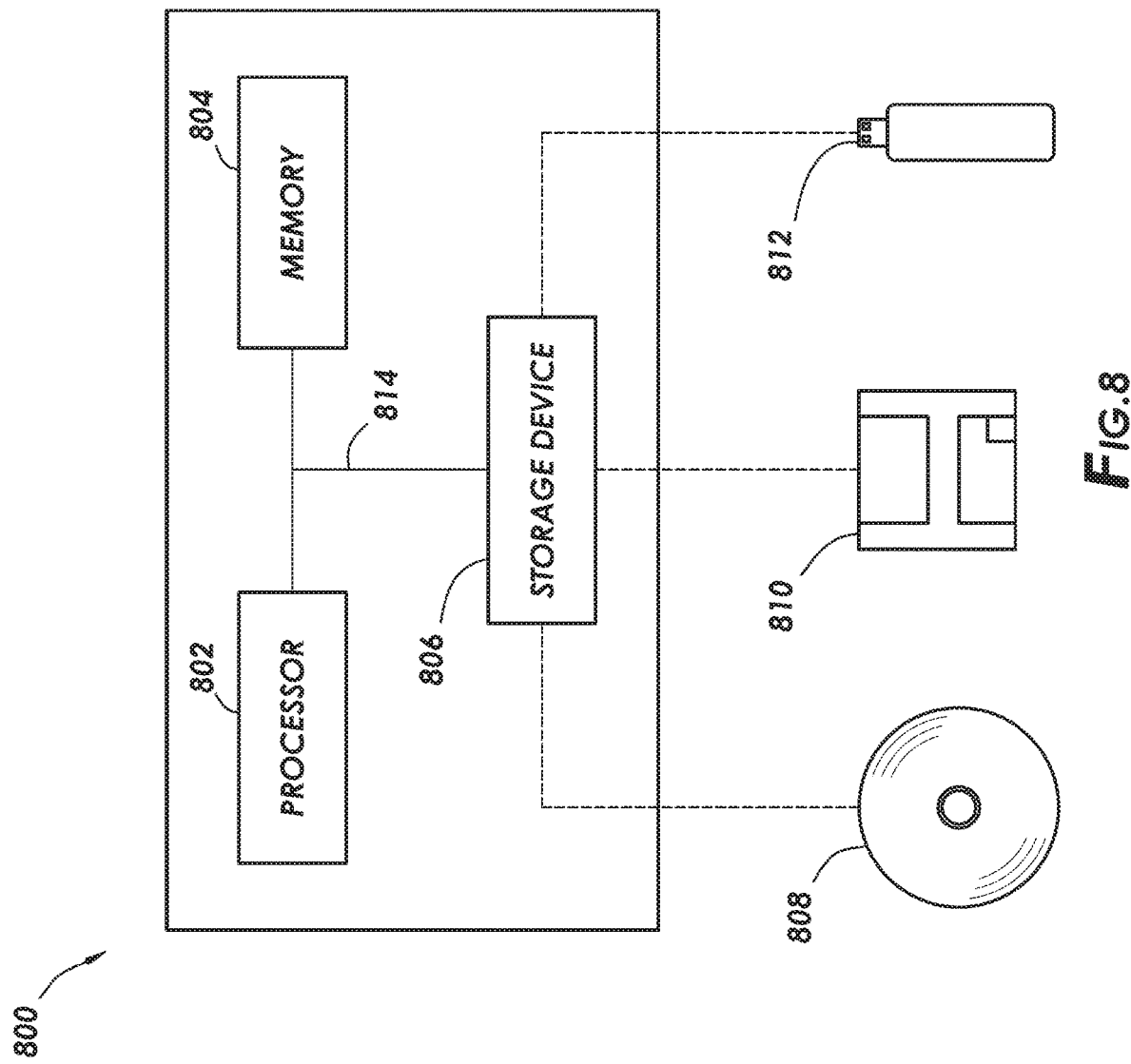
FIG. 8 shows a computer system in accordance with at least some embodiments.

FIG. 8 shows an example computer system 800 in accordance with at least some embodiments. In general, computer system 800 may exemplify a navigation and control system that may execute a survey plan to implement the example methods described herein; an onshore computer system that may be used in whole or in part to formulate the survey plans, including multiple 4D plot plans; and/or a computer system that may be used onboard a survey vessel to manufacture a geophysical data product while performing a monitor survey (as further described below). Computer system 800 comprises a processor 802 coupled to a memory 804 and a storage system or long term storage device 806. The processor 802 may be any currently available or after-developed processor, or group of processors. The memory 804 may be random access memory (RAM) which forms the working memory for the processor 802. In some cases, data and programs may be copied from the storage device 806 to the memory 804 as part of the operation of the computer system 800.

The long term storage device 806 is a device (or devices) that implements computer-readable, non-volatile, long-term storage, which may also be referred to as a tangible, non-transitory computer-readable medium. In some cases, the long term storage device is a hard drive or solid state drive, but other examples include optical discs 808, magnetic disks 810, and flash memory devices 812. The various survey plans used to implement the method aspects described herein may thus be stored on the long term storage device 806 and executed by the processor 802. In addition, during the performance of a monitor survey in accordance with the techniques described above, signals that are generated by geophysical sensors (e.g. hydrophones and/or geophones) located in the towed streamers may be received by a computer system 800 onboard the monitor survey vessel and stored in a tangible computer-readable medium, such as any of devices 806-812, thereby manufacturing a geophysical data product during the performance of the monitor survey.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of performing a 4D monitor marine geophysical survey over at least first and second areas covered, respectively, by first and second preexisting baseline surveys, comprising:
   deploying a monitor survey streamer layout that can be used to repeat streamer positions of both the first and the second preexisting baseline surveys; and
   using the monitor survey streamer layout to perform the monitor survey over the first and second areas in a manner that repeats all streamer positions of the first preexisting baseline survey when over the first area, and that repeats all streamer positions of the second preexisting baseline survey when over the second area;
   wherein first and second streamer layouts corresponding to the first and second preexisting baseline surveys, respectively, differ in at least one of the following characteristics: streamer separation or total number of streamers.

2. The method of claim 1, wherein:
a first subset of streamers in the monitor survey streamer layout is configured according to the first streamer layout; and
a second subset of streamers in the monitor survey streamer layout is configured according to the second streamer layout.

3. The method of claim 2, wherein:
the total number of streamers in the monitor survey streamer layout is less than a sum of the total number of streamers in the first and second streamer layouts.

4. The method of claim 1, wherein:
a monitor survey vessel performing the monitor survey follows sail lines of the second preexisting baseline survey when over the second area but, when over the first area, follows modified sail lines having a cross-line offset relative to sail lines of the first preexisting baseline survey.

5. The method of claim 4, wherein the method further comprises:
towing, with the monitor survey vessel, one or more sources in a manner that causes the one or more sources to repeat source activation positions of the first preexisting baseline survey when over the first area and to repeat source activation positions of the second preexisting baseline survey when over the second area.

6. The method of claim 5, wherein:
when the monitor survey vessel is following the modified sail lines, towing the one or more sources to repeat source activation positions of the first preexisting baseline survey comprises locating at least one of the sources in a manner that compensates for the cross-line offset.

7. The method of claim 6, wherein:
locating the at least one source is accomplished at least in part by source steering.

8. The method of claim 6, wherein:
locating the at least one source is accomplished at least in part by towing, at a variety of cross-line offsets, more sources than were towed in the first preexisting baseline survey.

9. The method of claim 8, wherein:
repeating the source activation positions of the first and second preexisting baseline surveys comprises activating a first subset of sources when over the first area and activating a second subset of sources when over the second area.

10. The method of claim 4, wherein:
the first streamer layout has a total number of streamers $N_A$ and streamer separation $S_A$;
the second streamer layout has a total number of streamers $N_B$ and streamer separation $S_B = kS_A$, where k is a positive natural number;
a total number of streamers $N_M$ in the monitor survey streamer layout is at most $N_A + N_B - \text{ceil}(N_A/k) + 1$; and
the cross-line offset of the modified sail lines is at most $\frac{1}{2}S_A$.

11. The method of claim 2, wherein:
the first streamer layout has a total number of streamers $N_A$, a total cross-line width $W_A$, and streamer separation $S_A$;
the second streamer layout has a total number of streamers $N_B$, a total cross-line width $W_B \geq W_A$, and streamer separation $S_B = kS_A$, where k is a positive natural number; and
a total number of streamers $N_M$ in the monitor survey streamer layout is equal to $N_A + N_B - \text{ceil}(N_A/k)$.

12. The method of claim 1, wherein:
using the monitor survey streamer layout to perform the monitor survey over the first and second areas is performed without reconfiguring the monitor survey streamer layout between the first and second areas.

13. The method of claim 1, wherein:
streamer separation in the monitor survey streamer layout is a constant.

14. A tangible computer-readable medium having a survey plan stored therein that, when executed by a navigation and control system on a vessel, causes the vessel to perform activities relating to a 4D monitor marine geophysical survey over at least first and second areas covered by first and second preexisting baseline surveys, respectively, the activities comprising:
towing a monitor survey streamer layout corresponding to the survey plan to perform the monitor survey over the first and second areas in a manner that repeats all streamer positions of the first preexisting baseline survey when over the first area, and that repeats all streamer positions of the second preexisting baseline survey when over the second area;
wherein first and second streamer layouts corresponding to the first and second preexisting baseline surveys, respectively, differ in at least one of the following characteristics: streamer separation or total number of streamers; and
wherein the monitor survey streamer layout corresponding to the survey plan is such that repeating the streamer positions of both the first and second preexisting baseline surveys does not require reconfiguring the monitor survey streamer layout between the first and second areas.

15. The medium of claim 14, wherein the monitor survey streamer layout corresponding to the survey plan is such that:
a first subset of streamers in the monitor survey streamer layout corresponds to the first streamer layout; and
a second subset of streamers in the monitor survey streamer layout corresponds to the second streamer layout.

16. The medium of claim 15, wherein the monitor survey streamer layout corresponding to the survey plan is such that:
the total number of streamers in the monitor survey streamer layout is less than a sum of the total number of streamers in the first and second streamer layouts.

17. The medium of claim 14, wherein:
the survey plan causes the vessel to follow sail lines of the second preexisting baseline survey when over the second area but, when over the first area, to follow modified sail lines having a cross-line offset relative to sail lines of the first preexisting baseline survey.

18. The medium of claim 14, wherein:
the survey plan further causes the vessel to tow one or more sources in a manner that causes the one or more sources to repeat source activation positions of the first preexisting baseline survey when over the first area and to repeat source activation positions of the second preexisting baseline survey when over the second area.

19. A method of manufacturing a geophysical data product, comprising:
deploying a monitor survey streamer layout that can be used to repeat streamer positions of first and second preexisting baseline surveys over first and second areas, respectively; and
using the monitor survey streamer layout to perform a monitor survey over the first and second areas in a manner that repeats all streamer positions of the first preexisting baseline survey when over the first area, and that repeats all streamer positions of the second preexisting baseline survey when over the second area;

wherein first and second streamer layouts corresponding to the first and second preexisting baseline surveys, respectively, differ in at least one of the following characteristics: streamer separation or total number of streamers; and recording, in a tangible computer-readable medium, signals generated by at least some geophysical sensors located within streamers of the monitor survey streamer layout during the monitor survey.

20. The method of claim 19, wherein:

a first subset of streamers in the monitor survey streamer layout is configured according to the first streamer layout;

a second subset of streamers in the monitor survey streamer layout is configured according to the second streamer layout; and the total number of streamers in the monitor survey streamer layout is less than a sum of the total number of streamers used in the first and second streamer layouts.

* * * * *